Dec. 1, 1931.  A. F. IHDE  1,834,709
RADIATOR MOUNTING
Filed Aug. 22, 1930
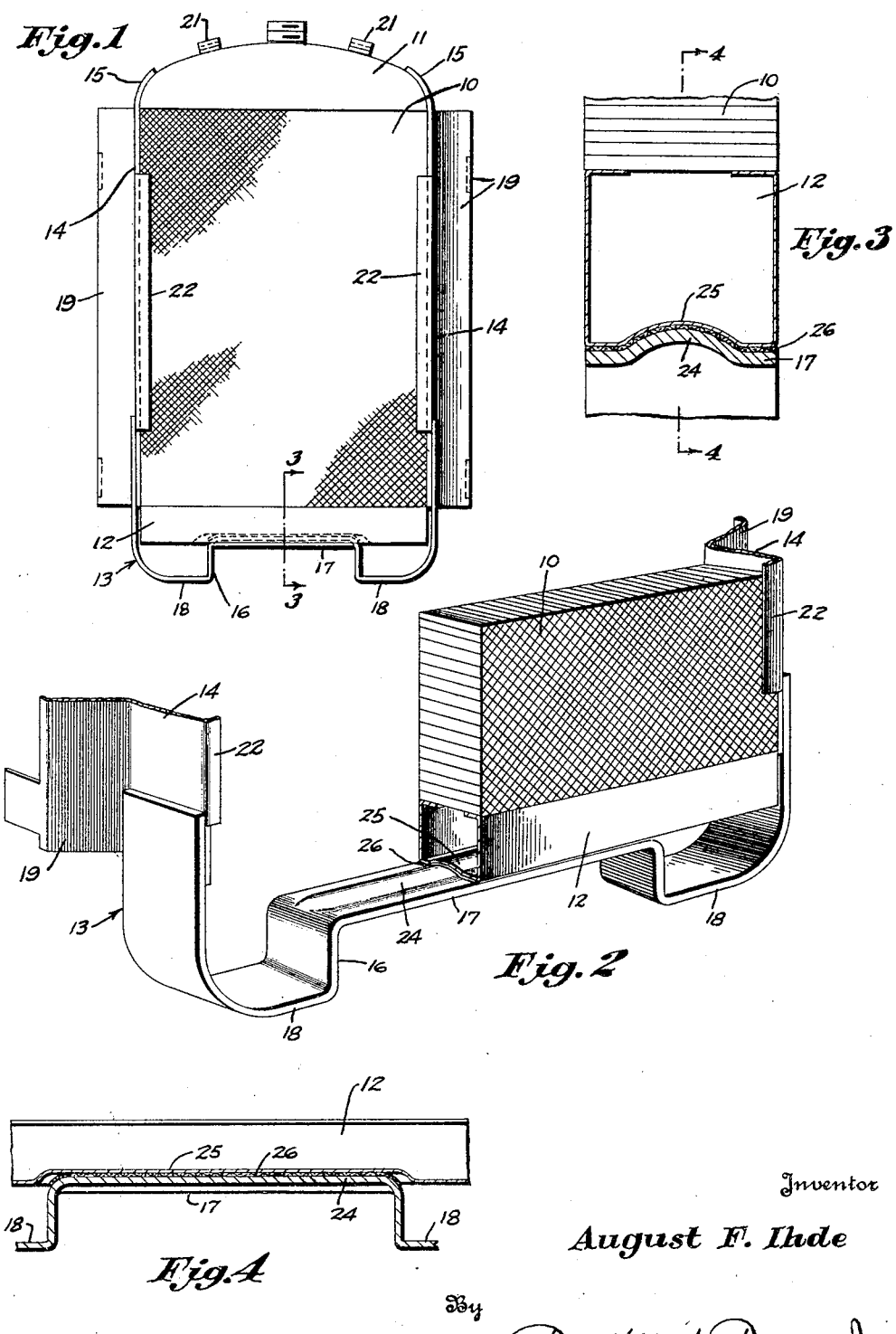
Inventor
August F. Ihde
By
Barton A. Beacom
Attorney Patented Dec. 1, 1931

1,834,709

UNITED STATES PATENT OFFICE

AUGUST F. IHDE, OF BUFFALO, NEW YORK, ASSIGNOR TO FEDDERS MFG. CO., OF BUFFALO, NEW YORK

RADIATOR MOUNTING

Application filed August 22, 1930. Serial No. 477,127.

This invention relates to radiator mountings and particularly to a mounting for motor vehicle radiators upon the chassis.

In current automobile practice the water-cooling radiator; comprising a central cooling portion having relatively small and thin-walled water passageways surrounded by larger passages adapted to pass large volumes of air for absorbing heat from the motor cooling water, and upper and lower water tanks attached to the cooling portion; is mounted to a front portion of the vehicle chassis or frame, the upper and lower tanks communicating with the engine water jacket through suitable conduits. The radiator core is invariably constructed of very light metal, in order to provide for efficient heat transfer, and since the vehicle frame is subjected to vibrations and strains, it is customary to mount the core on the frame by means of a resilient saddle which prevents excessive shocks being transmitted to the core. One typical form of saddle or stud bar embodies a substantially U-shaped strip of metal, the lateral upright portions of which engage the side edges of the cooling portion of the core, while the upper ends of these upright portions are rigidly secured to the upper tank, the lower or horizontal portion of the bar extending beneath the lower core tank and being secured to the vehicle frame.

In attaching the saddle to the radiator core, the saddle is placed about and brought into engagement with the core, after which the upper saddle portions are bent over the upper water tank and affixed thereto by soldering or other means. During this operation it is necessary that the core and saddle be accurately aligned by the workman, a task which requires considerable time and effort and results in relatively great labor costs for this item in the production of a complete core. The present invention contemplates a saddle and core construction wherein these parts may be quickly and positively aligned prior to the attaching operation with a large saving of time, and, consequently, a reduction in labor cost. This may be accomplished by forming interfitting indentations on the lower central portions of the lower tank and saddle which will automatically align the parts as they are assembled together and which are so proportioned as to permit of desired small relative movements of these portions which may occur in the absorption of distortional stresses by the saddle member when the radiator is mounted upon a motor vehicle.

These and other objects and advantages will become apparent as the description proceeds, reference being made to a typical construction incorporating the principles of the invention and illustrated in the accompanying drawings wherein:—

Fig. 1 is a front elevation of a completely assembled radiator core with the saddle or stud bar mounting means attached.

Fig. 2 is an enlarged perspective view of the lower core and saddle assembly, portions of the core being broken away to reveal the positive aligning means.

Fig. 3 is a transverse vertical sectional view taken on line 3—3 of Fig. 1.

Fig. 4 is a longitudinal vertical section taken along line 4—4 of Fig. 3.

As shown in Fig. 1, the radiator core, comprising a central cooling portion 10 and upper and lower water tanks 11 and 12 respectively, is mounted upon the U-shaped saddle member 13 which includes upright side bars 14 having upper lips 15 adapted to be bent over and securely affixed to the upper tank 11, and a lower strip 16, the central portion 17 of which is elevated for engagement with the lower tank 12, and the side portions 18 of which are adapted to be rigidly secured to the frame of an automotive vehicle (not shown). The side bars 14 and the tank 11 are provided with rearwardly extending elements 19 and 21 respectively which are utilized to support a conventional radiator shell (not shown). The side bars 14 are further provided with inwardly turned flanges 22 which may engage the cooling portion 10 of the core. It will be seen that the core proper is virtually suspended from the points of attachment of the upper tank 11 to lips 15, and that the lower tank 12 may, the saddle bars being formed of resilient metal, effect slight lateral movements relative to the saddle portion 17.

The horizontal saddle portion 17 is provided with a central longitudinal rib or corrugation 24 of gradually curved cross-section, as shown in Fig. 3 and which merges as depicted in Figs. 2 and 4, with the flat horizontal portion 17 at its ends. A depression or recessed rib 25 of contour similar to that of the rib 24 is formed in the lower or bottom surface of the tank 12, being extended to slightly greater length than rib 24 to accommodate the slight relative movements between the lower tank 12 and saddle portion 17 hereinbefore mentioned. A shock absorbing gasket or pad 26, preferably formed of a woven fabric such as canvas, is interpositioned between the portion 17 and the tank 12, to reduce vertical shocks which might otherwise be transmitted from the saddle to the core.

In attaching the core and saddle members, the saddle is placed about the core in the usual manner, the portions 17 and 14 being brought into engagement with the core, and the lips 15 are bent over the upper tank 11 and soldered or otherwise permanently affixed thereto. The workman need align only the upper saddle and core portions since the lower portions will be positively aligned by the interengagement of the ribs 24, 25. The affixing operation is thereby greatly facilitated with a resulting appreciable decrease in labor cost. The necessary slight freedom of flexibility of the parts is preserved, lateral movability of the parts being afforded by the difference in lengths of the deformations 24 and 25 while slight relative forward or backward movements as from left to right or vice versa in Fig. 3 is permitted by the shallow curvature of the portions 24 and 25 and the flexibility of the interpositioned gasket or pad 26.

It will be understood that the structure described is merely exemplary of the invention which is intended shall be commensurate in scope with that of the appended claims.

What is claimed is:

1. A radiator assembly including a core having a lower water tank, and resilient means for mounting the core upon the frame of a motor vehicle, said means including a substantially horizontal member lying beneath said tank, a rib formed on said member and extending laterally thereacross, said tank having an indentation for interengagement with said rib and said indentation being of different length than said rib whereby small relative movements are permitted between said core and said member.

2. A radiator assembly including a core having a lower tank, a saddle having upright members for engaging the side edges of said core and attached to said core at the top thereof, said saddle member having a substantially horizontal member lying beneath said tank, and a pad interposed between said horizontal member and said tank, said horizontal member and said tank having interfitting ribs formed on the adjacent surfaces thereof, the entering one of said ribs being of lesser length than the receiving rib.

3. In combination with the lower water tank of a radiator core, a substantially horizontal member disposed beneath said tank and adapted to be mounted upon the frame of a motor vehicle, said tank having a depression formed in the under surface thereof and extending transversely thereacross, and said member having an upstanding rib substantially conforming to the contour of said depression and interfitting therewith, said rib being of lesser length than said depression.

4. A radiator assembly including a core having a lower tank member, and a saddle for mounting the core upon the frame of a motor vehicle, said saddle comprising a resilient metal strap having upright portions extending along the side edges of the core and secured at their upper ends to an upper portion of the core and a horizontal portion lying adjacent the lower surface of the tank and connecting the upright portions, whereby the core may move laterally relative to the saddle by the resilience of said upright portions, said horizontal portion of the saddle and the tank having interfitting ribs formed on the adjacent surfaces thereof, the entering one of said ribs being of lesser length that the receiving one of said ribs to permit the relative lateral movement.

5. A radiator assembly including a core having a lower tank, a saddle for mounting the core upon the frame of a motor vehicle, said saddle comprising a resilient metal strap of substantially U-shape, the upright portions thereof extending along the side edges of the core and secured at their upper ends to an upper portion of the core, and a horizontal portion lying adjacent the lower surface of the tank and connecting the upright portions, said horizontal portion and the tank having interfitting ribs formed on the adjacent surfaces thereof, and pad means disposed between said interfitting ribs, whereby the core may have slight movement relative to the horizontal portion of the saddle by reason of the resilience of the upright portions.

AUGUST F. IHDE.